(12) United States Patent
Guy

(10) Patent No.: US 6,826,348 B2
(45) Date of Patent: Nov. 30, 2004

(54) BEAM SPLITTER WAVE GUIDE APPARATUS AND METHOD

(75) Inventor: James Kevan Guy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 10/241,341

(22) Filed: Sep. 11, 2002

(65) Prior Publication Data

US 2004/0046954 A1 Mar. 11, 2004

(51) Int. Cl.[7] .............................. G02B 6/00; F21V 7/04
(52) U.S. Cl. ........................ 385/147; 385/140; 362/551
(58) Field of Search ................................. 385/147, 140, 385/123, 901, 902; 362/551, 552, 583

(56) References Cited

U.S. PATENT DOCUMENTS

2002/0009275 A1 * 1/2002 Williams et al. ............ 385/123

* cited by examiner

Primary Examiner—Frank G. Font
Assistant Examiner—Michael P. Mooney
(74) Attorney, Agent, or Firm—Harness Dickey & Pierce P.L.C.

(57) ABSTRACT

A beam splitter wave guide apparatus and method for enabling the selection of one of a plurality of distinct spectra of an optical input signal and for enabling an intensity of a resulting output signal to be adjusted. The apparatus comprises a cylindrical optical element having an input end and an output end. The input end includes a pair of spaced apart surfaces that each include a suitable filter formed thereon. A first one of the filters passes a first spectrum of light and reflects all other light outside the first spectrum. The second filter passes a second spectrum of light but reflects all other light outside of the second spectrum. Rotating the cylindrical optical element allows either the first or second spectrum to be selected such that an optical output signal is generated having the desired spectrum. Controlled rotational movement of the cylindrical optical element further allows the intensity of the resulting optical output signal to be varied as needed.

28 Claims, 2 Drawing Sheets

BEAM SPLITTER WAVE GUIDE APPARATUS AND METHOD

FIELD OF THE INVENTION

The present invention relates to optical elements and systems, and more particularly to a beam splitter wave guide apparatus capable of selectively filtering an optical input signal to provide at least two different optical spectra, and further operable to enable adjustment of the intensity of an output optical signal produced by the apparatus by selective rotational movement of an optical element of the apparatus.

BACKGROUND OF THE INVENTION

In designing a dual-mode illumination system, the usual method for altering the output spectrum is to move filters in the path of the input light source. If the intensity of a bulb producing the output optical signal also needs to be adjusted (i.e., for arc lamps), then an iris, neutral density filter or other obstruction method is typically required to accomplish this task. This is because the bulb producing the optical input signal is not readily dimmable.

Accordingly, there exists a need for an apparatus and method which is capable of not only allowing one of a plurality of output spectra for an input optical signal to be generated, but also for a system and method which allows for adjustment of the intensity of the output optical signal.

More preferably, there exists a need for such an optical system and method as described immediately above which does not require the physical movement of filters into the path of the light source. Such an optical system would significantly reduce the cost associated with providing the dual spectra and intensity adjustment features. Such a system would also be more compact and capable of being manufactured even more cost effectively than previous dual-mode illumination systems.

SUMMARY OF THE INVENTION

The present invention is directed to a beam splitter wave guide apparatus and method. In one preferred form the apparatus comprises an optical element having an input end and an output end. The input end includes a first portion and a second portion circumferentially offset from the first portion. The first portion includes a filter capable of passing only a first optical spectra of an optical input signal impinging thereon, while reflecting the remainder of the optical signal. Conversely, the second surface includes a filter for passing only a second optical spectra and reflecting the remainder of the optical signal. A suitable device is included for rotating the optical element such that either the first surface or the second surface is positioned to be illuminated by the optical input signal.

In operation, when the first surface is aligned with the optical signal source generating the optical input signal, the first surface operates to pass an optical signal therethrough having the first optical spectra, while the second surface reflects this spectra to the output end of the optical element. When the optical element is rotated into position such that the optical input signal illuminates the second surface, then the second surface passes an optical signal having the second optical spectra therethrough. This spectra is then reflected off of the first surface towards the output end of the optical element.

It is a principal feature of the apparatus and method of the present invention that rotational movement while the optical input signal is impinging either the first surface or the second surface causes a variation in the intensity of the output signal produced at the output end of the optical element. Accordingly, the apparatus and method allows one of at least a pair of optical spectra to be selected by the selective rotational positioning of the optical element, as well as allowing for an adjustment in the intensity of the resulting output optical signal.

In a preferred embodiment the optical element further includes a third surface which is arranged between the first and second surfaces. When the input optical signal impinges the third surface, the optical signal passes therethrough and no output signal is produced at the output end of the optical element. In a preferred embodiment, the first and second surfaces are provided by beveled surfaces each having an appropriate filter formed thereon. The beveled surfaces cooperatively provide a chisel-type end to the optical element.

In an alternative preferred embodiment, the input end of the optical element comprises a conic shape. A first portion of the conic shape includes a first filter for passing only a first spectrum of the input optical signal and reflecting the remainder of the input optical signal. A second surface circumferentially offset from the first surface includes a filter that passes a second spectrum of the input optical signal but reflects the remainder of the input optical signal. Rotational positioning of the optical element therefore allows for the selection of an output signal having either the first or second spectrum. Similarly, controlled, rotational movement of the optical element while the input optical signal is illuminating either the first surface or the second surface allows the intensity of the resulting optical output signal to be varied. With this embodiment, portions of the input end in between the first and second surfaces are coated with an opaque coating to prevent any possible Total Internal Reflection (TIR) of the input optical signal to the output end.

It is a principal advantage of the apparatus and method of the present invention that no external mirrors, prisms or external filtering elements are required. Selectively coating surfaces of the input end of the optical element with suitable filtering material to produce the desired spectra and precisely rotationally positioning the optical element allows a desired spectrum to be selected, as well as a desired intensity, for the resulting output signal.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
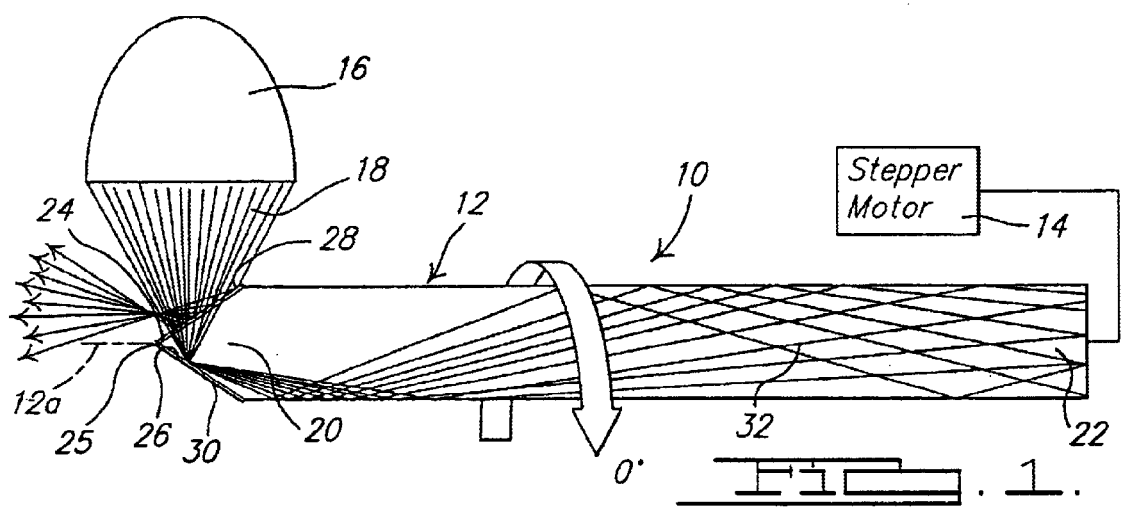
FIG. 1 is a simplified side view of a preferred embodiment of the present invention with a cylindrical optical element being positioned to provide an optical signal having a first optical spectrum.

Referring to FIG. 1, there is shown a beam splitter wave guide apparatus 10 in accordance with a preferred embodiment of the present invention. The apparatus 10 includes a cylindrical optical element 12 which is operatively coupled to a means for rotating the element 12. In one preferred form the means for rotation comprises a stepper motor 14. However, it will be appreciated that virtually any form of electric motor or other device/component could be used that provides controlled rotational movement of the cylindrical optical element 12.

An external, full spectrum light source 16 including an elliptical reflector or focusing optic is used to generate an input optical signal 18. It will be appreciated, however, that the light source 16 is an external component that, strictly speaking, does not form a portion of the apparatus 10.

The cylindrical optical element 12 can comprise a clad glass rod or any other optical element suitable for passing a light signal therethrough. Also, while this element has been referred to as a "cylindrical" component, it will be appreciated that it need not necessarily be shaped in a cylindrical form. Essentially, any shape could be employed provided it enables the element 12 to be easily rotated.

The cylindrical optical element 12 includes an input end 20 and an output end 22. The input end 20 includes a first portion or surface 24 and a second portion or surface 26. The first and second surfaces 24 and 26 are illustrated as beveled surfaces that form a chisel-type point 25 at the input end 20. However, it will be appreciated that the input end 20 could be ground or otherwise formed to a conic shape and be capable of performing the needed spectra selection and intensity adjustment functions, as will be described momentarily.

The first portion 24 of the input end 20 further includes a first filter 28 formed thereon. First filter 28 is formed to pass a first spectrum of light from the optical input signal 18. The filter 28 is also designed to reflect the remainder of light from the optical input signal 18. Conversely, the second surface 26 includes a filter 30 formed thereon which is designed to pass a second spectrum of light while reflecting the remainder of the optical input signal 18. The filters 28, 30 could be formed by any suitable coating, such as a dichroic coating, a vacuum deposited aluminum (VDA), a coating formed by sputtering, etc.

Turning now to the operation of the apparatus 10, when the cylindrical optical element 12 is arranged such that the input optical signal 18 illuminates the first portion 24 of the input end 20, light having a wavelength within the first spectrum passes through the filter 28 and is reflected from the filter 30 of the second portion 26 towards the output end 22. This reflected light is designated by reference numeral 32 and will be referred to as the output optical signal. All other light is reflected by the first filter 28 away from the cylindrical optical element 12 because of the taper of the first portion 24. Merely by way of example, the first spectrum may comprise a red light which forms the optical output signal 32.

Figure 2:
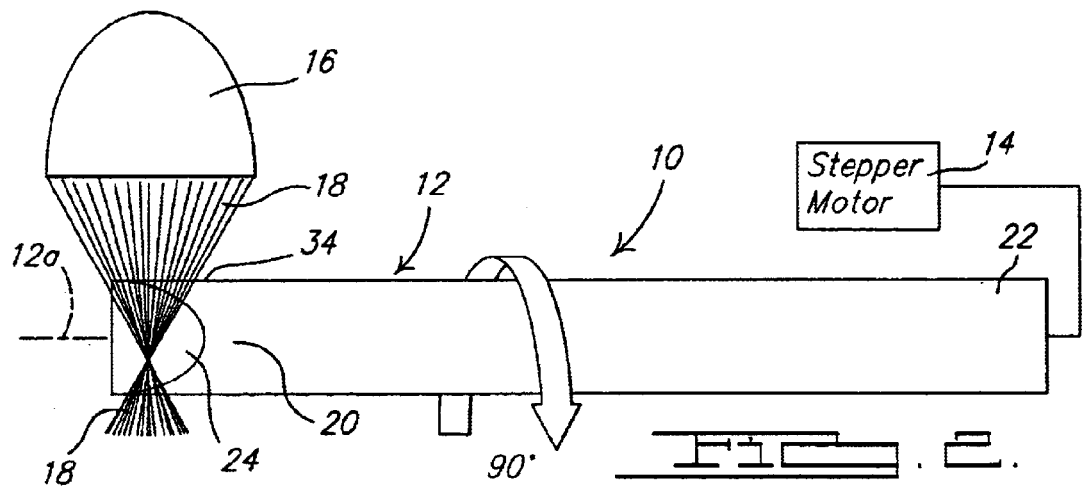
FIG. 2 is a view of the apparatus of FIG. 1 but with the cylindrical optical element having been rotated 90 degrees from the position shown in FIG. 1 to eliminate an output optical signal.

Referring to FIG. 2, as the cylindrical optical element 12 is rotated about its longitudinal axis 12a 90 degrees from the position shown in FIG. 1, the input optical signal 18 illuminates one of a pair of third surfaces 34 of the input end 20 that are spaced 180 degrees apart from one another. The third surface 34 is positioned circumferentially in between the first portion 24 and the second portion 26. Light illuminating the third surface 34 simply passes through the input end 20 and is not coupled into the cylindrical element 12. Therefore, no output optical signal is generated.

Figure 3:
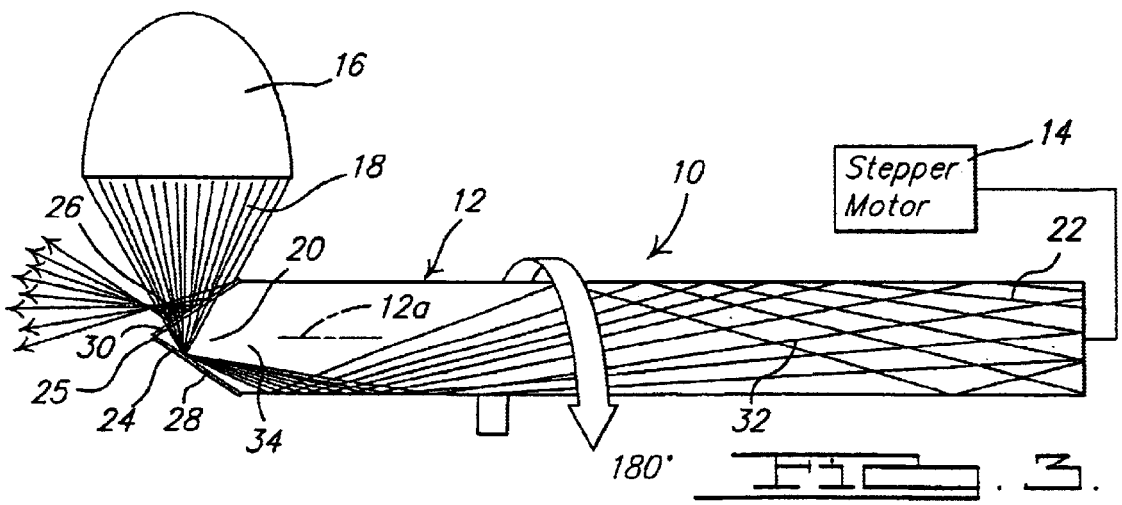
FIG. 3 is a view of the apparatus of FIG. 2 after having been rotated 90 degrees past the position shown in FIG. 2 to produce an output optical signal having a second optical spectrum.

Referring to FIG. 3, as the cylindrical element 12 is rotated 90 degrees further from the position shown in FIG. 2, the input optical signal 18 illuminates the second portion 26 of the input end 20. The filter 30 formed on this portion passes the second spectrum but reflects all other spectra of light. The light passing through the filter 30 is reflected by the filter 28 of the first portion 24 and thereby coupled into the cylindrical optical element 12. This causes the output optical signal 32 to be transmitted to the output end 22 of the cylindrical optical element 12.

To adjust the intensity of the output optical signal 32 coupled into the cylindrical optical element 12, the element 12 need only be rotated to vary the intensity of the optical output signal 32 between a maximum value and a minimum value. For example, if the cylindrical optical element 12 is rotated from the position shown in FIG. 1 only a few degrees towards the position shown in FIG. 2, a lesser percentage of the optical input signal 18 will be coupled into the cylindrical optical element 12 as the first portion 24 of the input end 20 moves away from facing relation to the optical input signal 18. For example, if the optical output signal 32 is forming a red light at the output end 22 of the cylindrical optical element 12, then in the position shown in FIG. 2, this red light will be completely attenuated. Thus, as the cylindrical output element 12 moves from the position shown in FIG. 1 to the position shown in FIG. 2, the intensity of the red light representing the output optical signal 32 will diminish from a maximum (FIG. 1) to a minimum (essentially zero, shown in FIG. 2). However, as rotation continues from the position shown in FIG. 2 into that shown in FIG. 3, the output signal 32 having the second spectra is coupled into the cylindrical optical element 12. If this light comprises, for example, a green light, then the output optical signal 32 will appear as a green light that increases in intensity from a minimum level to a maximum level when the cylindrical optical element 12 is rotated into the position shown in FIG. 3.

Thus, by including the filters 28 and 30 and by rotating the cylindrical optical element 12, not only can the spectra of the resulting output optical signal 32 be changed, but also the intensity of the resulting output optical signal 32 can be varied as needed from a minimum (i.e., imperceptible) level to a maximum level.

While only two distinct portions 24 and 26 have been shown for the input end 20 of the cylindrical optical element 12, it will be appreciated that more than two such surfaces could be formed at the input end 20 to thus provide the ability to select from three or more distinct spectra.

Figure 4:
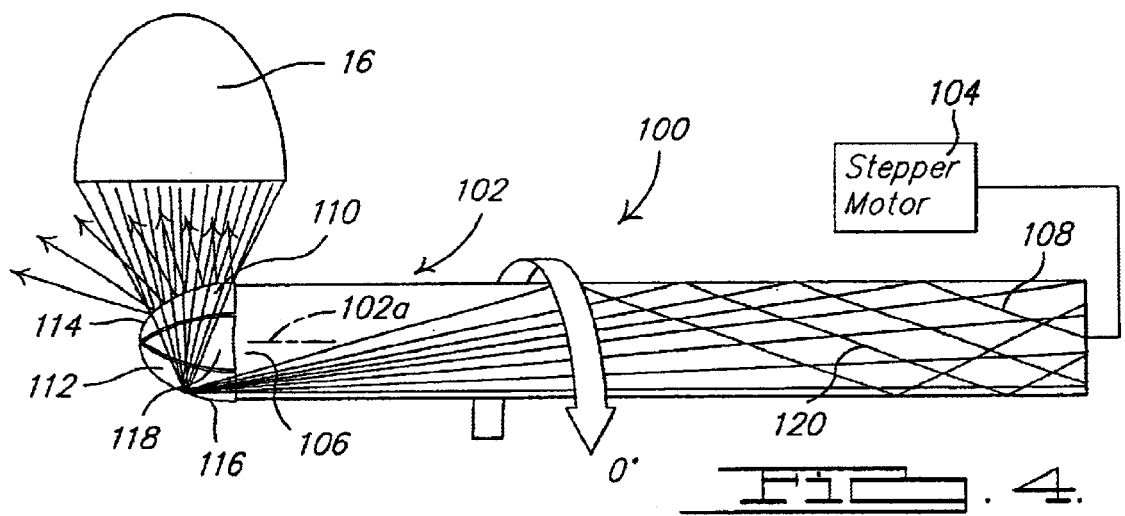
FIG. 4 is a view of an alternative preferred embodiment of the present invention incorporating a conic input end for the cylindrical optical element, and further showing an output signal being produced having a first optical spectrum.
Figure 5:
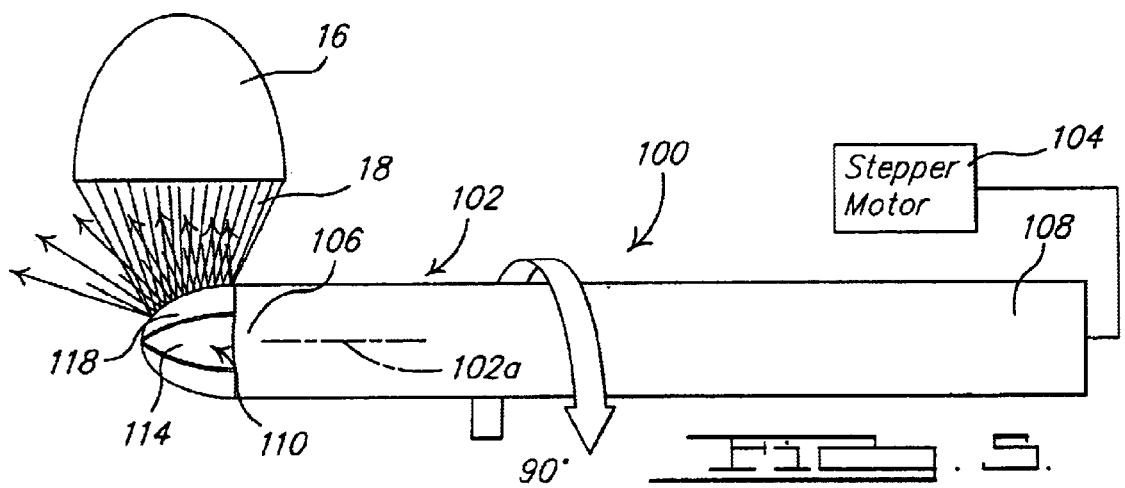
FIG. 5 is a view of the apparatus of FIG. 4 after the cylindrical optical element has been rotated 90 degrees, thus preventing any optical output signal from being generated.
Figure 6:
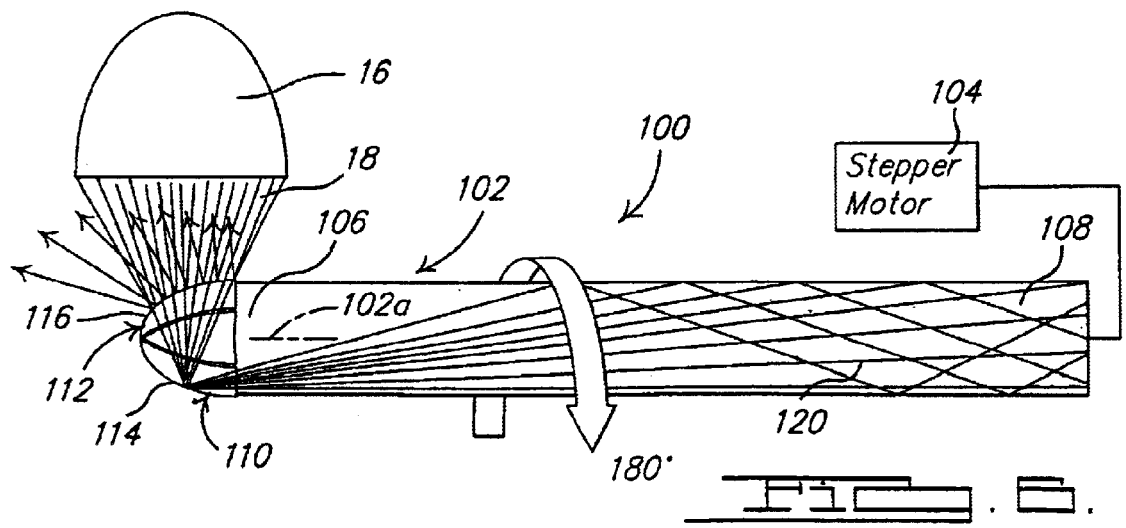
FIG. 6 is a view of the apparatus of FIG. 5 after the cylindrical optical element has been rotated 90 degrees past the position shown in FIG. 5, to thereby cause an optical output signal to be generated having a second optical spectrum.

Referring now to FIGS. 4–6, an apparatus 100 in accordance with an alternative preferred embodiment of the present invention is shown. The apparatus 10 similarly includes a cylindrical optical element 102 which may be formed by a clad glass rod or other suitable light transmitting material. However, the element 102 need not be cylindrical throughout its entire length.

The cylindrical optical element 102 is similarly rotated about its longitudinal axis 102a by a stepper motor 104 or any other means for rotationally moving the element 102 in a controlled manner. A principal difference between the element 12 and the element 102 is the inclusion of a conic input end 106. The construction of an output end 108 of the cylindrical optical element 102 is essentially identical to that of the element 12.

The conic input end 106 includes a first portion 110 and a second portion 112 that is circumferentially offset by approximately 180 degrees from the first portion 110. The first portion 110 essentially forms a surface having a first filter 114 formed thereon. The second portion 112 essentially forms a surface having a second filter 116 formed thereon. The first filter 114 may likewise comprise a suitable coating (dichroic coating, VDA, sputtering, etc.) to pass a first spectrum of the optical input signal 18 while reflecting all other spectra of the optical input signal 18. Conversely, the second filter 116 operates to pass the second spectrum but to reflect all other spectra of the optical input signal 18. A pair of third portions 118 arranged 180 degrees from one another are included at the conic input end 106 that each comprise an opaque coating for preventing any reflection of the optical input signal 118.

In operation, when the cylindrical optical element 102 is positioned as shown in FIG. 4, the first spectrum of light passes through the first filter 114 while all other light is reflected therefrom away from the cylindrical optical element 102. The light passing through the first filter 114 is reflected by the second filter 116 at the second portion 112 of the input end 106 and coupled into the cylindrical optical element 102 to form an optical output signal 120.

Referring to FIG. 5, when the cylindrical optical element 102 is rotated 90 degrees from the position shown in FIG. 4, all of the optical input signal 18 is absorbed by the opaque coating 118. Thus, there is no optical output signal produced.

Referring to FIG. 6, as the cylindrical optical element 102 is rotated 90 degrees past the position shown in FIG. 5, light from the optical input signal 18 having the second spectrum passes through the second filter 116 while all other light is reflected therefrom. Light having the second spectrum is then reflected off of the first filter 114 and coupled into the cylindrical optical element 102 to produce the output signal 120.

As with the apparatus 10, slight rotational movement of the cylindrical optical element 102 causes a change in intensity of the optical output signal 120 coupled into the cylindrical optical element 102. The output optical signal 120 can be varied from a minimum (i.e., essentially imperceptible) level to a maximum level by controllably rotating the cylindrical optical element 102 via the stepper motor 104 or any other suitable means for providing rotational movement to the element 102.

It will be appreciated that if the apparatuses 10 and 100 also perform the function of randomizing the output distribution of the output optical signal 32 or 120 to create a more even distribution across a fiber optic bundle face coupled to the apparatus 10 or 100. Thus, the apparatus 10 or 100 performs the functions of selecting an output spectra, adjusting intensity of an output optical signal, and functioning as a fiber feed to an external optical transmission element.

The optical input signal 18 is preferably a collimated optical signal, but it will be appreciated that the apparatuses 10 and 100 can accommodate a focused beam realizing the minor spectral shift associated with a cone of light going through a filter designed for a specific incident angle. This consideration would not even be present if there is a sufficiently broad spectral band requirement. In this instance, each of the filters 28, 30 and 114, 116 could be designed for the middle of the spectral band and any wavelength shift, due to the incident beam angles, can be less than the shoulder of the filter cutoff wavelength which meets the requirement.

For the apparatus 100, the concern of the spectral shift due to filter orientation does not exist because the filters 114, 116 are applied to a body of revolution (i.e., the conic input end 106 of the cylindrical optical element 102). The input end 106 can be formed as a spherical end, an elliptical end, as a parabolic-shaped end or as a hyperbolic shaped end depending upon the desired output distribution of the optical output signal 120.

The various preferred embodiments of the present invention can be implemented with little or no modification in a wide variety of optical systems. The ability to select not only a desired spectrum but also to adjust the intensity of an output optical signal provides a significant degree of control over the characteristics of an optical signal.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for enabling the selection of at least one optical spectrum for an optical signal, comprising:

an optical element having an input end and an output end;

said input end including a first surface and a second surface, spaced apart from said first surface;

said first surface including a first coating for passing a first desired optical spectrum for said optical signal and reflecting a remainder of said optical signal;

said second surface including a second coating for reflecting said optical signal therefrom;

a device for rotating the optical element about a longitudinal axis thereof from a first position to a second position;

wherein in said first position, said optical signal passes through said first surface, is filtered by said first coating to provide said first desired optical spectrum, and is reflected by said second surface to said output end of said optical element having a first intensity; and in said second position said optical signal maintains said desired optical spectrum but includes a second intensity.

2. The apparatus of claim 1, wherein said first intensity is greater than said second intensity.

3. The apparatus of claim 1, further comprising a third surface formed on said optical element and being displaced from said first and second surfaces, and wherein rotation of said optical element to cause said optical signal to illuminate said third surface produces no optical output signal at said output end of said optical element.

4. The apparatus of claim 1, wherein rotation of said optical element between said first and second positions causes an intensity of said optical signal illuminating said first surface to be continuously varied without altering said desired optical spectrum of said optical signal generated at said output end of said optical element.

5. The apparatus of claim 1, wherein said first surface of said input end of said optical element comprises a beveled surface.

6. The apparatus of claim 1, wherein said first surface and said second surface each comprise beveled surfaces forming a chisel-like configuration.

7. The apparatus of claim 1, wherein said input end of said cylindrical element comprises a conic surface.

8. An apparatus for enabling the selection of one of first and second optical spectra for an optical signal, comprising:
an optical element having an input end and an output end;
said input end including a first surface and a second surface displaced circumferentially from said first surface;
said first surface including a first filter for passing only a first optical spectrum and reflecting a remainder of said optical signal;
said second surface including a second filter adapted to pass only a second optical spectrum for said optical signal and to reflect a remainder of said optical signal;
a device for rotating the optical element about a longitudinal axis thereof from a first position to a second position;
wherein in said first position, said optical signal passes through said first surface, is filtered by said first filter to provide only said first optical spectrum, and is reflected by said second filter on said second surface to said output end of said optical element;
wherein in said second position said optical signal passes through said second surface, is filtered by said second filter to provide only said second optical spectrum, and is reflected by said first filter on said first surface to said output end of said optical element.

9. The apparatus of claim 8, wherein rotational movement of said optical element while said optical signal is being directed at said first surface causes a variation in intensity of said optical signal reflected by said second surface to said output end of said optical element.

10. The apparatus of claim 8, wherein rotational movement of said optical element while said optical signal is being directed at said second surface causes a variation in intensity of said optical signal reflected by said first surface to said output end of said optical element.

11. The apparatus of claim 8, wherein said optical element further includes a third surface, and wherein when said optical signal illuminates said third surface said optical signal passes through said optical element without being reflected to said output end.

12. An apparatus for enabling the selection of one of first and second optical spectra for an optical signal and for adjusting an intensity of said optical signal, comprising:
an optical element having an input end and an output end;
said input end including a first surface and a second surface displaced circumferentially from said first surface;
said first surface including a first filter for passing only a first optical spectrum and reflecting a remainder of said optical signal;
said second surface including a second filter adapted to pass only a second optical spectrum for said optical signal and to reflect a remainder of said optical signal;
a device for rotating the optical element about a longitudinal axis thereof from a first position to a second position;
wherein in said first position, said optical signal passes through said first surface, is filtered by said first filter to provide only said first optical spectrum, and is reflected by said second filter on said second surface to said output end of said optical element;
wherein in said second position said optical signal passes through said second surface, is filtered by said second filter to provide only said second optical spectrum, and is reflected by said first filter on said first surface to said output end of said optical element; and
wherein rotational movement of said optical element while said optical signal is being directed at either of said first surface and said second surface causes a variation in intensity of said optical signal reflected to said output end.

13. The apparatus of claim 12, further comprising:
a third surface formed circumferentially in between said first and second surfaces for passing said optical signal, to thereby prevent said optical signal from being reflected to said output end.

14. The apparatus of claim 12, wherein said intensity of said optical signal is varied continuously as said optical element is rotated while said optical signal is impinging either of said first and second surfaces.

15. The apparatus of claim 12, wherein said first surface comprises a beveled end.

16. The apparatus of claim 12, wherein said second surface comprises a beveled end.

17. The apparatus of claim 12, wherein a midpoint of said first surface and a midpoint of said second surface are offset 180 degrees from one another about a circumference of said optical element.

18. The apparatus of claim 1, wherein said input end comprises a conic shape.

19. An apparatus mounted for rotational movement by an external component, wherein said apparatus enables either first or second optical spectra of an optical signal to be selected while simultaneously enabling an intensity of the optical signal to be adjusted, said apparatus comprising:
an optical element having an input end and an output end;
said input end having a first surface and a second surface;
said first surface including a first filter for passing only a first spectrum and reflecting all other light of an optical input signal;
said second surface including a second filter for passing only a second spectrum and reflecting all other light from said optical input signal;
said first and second surfaces being arranged on said input end so as to be offset by about 180 degrees from one another;
wherein placing said optical element in a first position enables said optical signal having said first spectrum to pass through said first filter and be reflected by said second filter to said output end of said optical element;
wherein rotating said optical element to a second position enables said optical signal having said second spectrum to pass through said second filter and to be reflected by said first filter to said output end of said optical element; and
wherein rotation of said optical element while said optical signal is illuminating either of said first and second surfaces enables said intensity of said optical signal being reflected to said output end to be controllably varied.

20. The apparatus of claim 19, wherein said optical element includes a third surface circumferentially displaced from said first and second surfaces for enabling said optical signal to pass through said optical element without being reflected to said output end.

21. The apparatus of claim 19, wherein said input end of said optical element comprises a conic shape.

22. The apparatus of claim 21, wherein said input end of said optical element further comprises at least one area disposed circumferentially in between said first and second surfaces having an opaque coating to prevent reflection of said optical signal therefrom.

23. The apparatus of claim 19, wherein said first and second surfaces comprise beveled surfaces that provide a chisel-like configuration to said input end of said optical element.

24. A method for enabling either first or second optical spectra of an optical signal to be selected, said method comprising:

directing said optical signal at an input end of an optical element, wherein the optical element also includes an output end;

using a first portion of said input end to pass said optical signal therethrough while providing a first spectrum to said optical signal and to reflect a remainder of said optical signal;

using a second portion of said input end that is circumferentially offset from said first portion to pass a second spectrum therethrough while reflecting a remainder of said optical signal; and selectively rotating said optical element to cause said optical signal to illuminate one of said first and second portions of said input end, to thereby cause said optical signal having either said first spectrum or said second spectrum to be selected and reflected to said output end of said optical element.

25. The method of claim 24, wherein rotation of said optical element while said optical signal is impinging either of said first and second portions of said input end enables an intensity of said optical signal reflected to said output end to be controllably varied.

26. The method of claim 24, further comprising forming said input end with a conic shape.

27. The method of claim 24, forming each of said first and second portions as a beveled surface.

28. The method of claim 24, further using a third portion of said input end to pass through said optical signal such that no portion of said optical signal is reflected to said output end of said optical element.

* * * * *